UNITED STATES PATENT OFFICE 2,599,653

GAMMA-NITRO-GAMMA-CARBALKOXY BUTYRALDEHYDES AND PROCESS

Owen A. Moe and Donald T. Warner, Minneapolis, Minn., assignors to General Mills, Inc., a corporation of Delaware No Drawing. Application June 20, 1951, Serial No. 232,654

8 Claims. (Cl. 260—483)

The present invention relates to the preparation of various gamma-nitro-gamma-carbalkoxy butyraldehydes and to the process of preparing these compounds.

The aldehydo compounds contemplated by the present invention may be illustrated by the following formula:

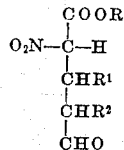

in which R represents a lower aliphatic group containing from 1 to 4 carbon atoms, such as methyl, ethyl, propyl or butyl, and $R^1$ and $R^2$ represent hydrogen or methyl. These aldehydes are useful in the preparation of tryptophane, lysine, ornithine, proline, and also alkyl-substituted amino acids and numerous other compounds.

It is therefore an object of the present invention to provide novel aldehydo compounds having the above formula, which are particularly useful for the synthesis of amino acids.

It is another object of the present invention to provide a novel process for producing these compounds.

These and other objects of the invention will be more fully apparent from the following description with particular reference to the specific examples which are to be understood as illustrative only and not as limiting the invention.

These aldehydo compounds may be prepared by the 1,4 addition of alpha,beta-saturated aldehydes to nitroacetic esters in accordance with the following reaction:

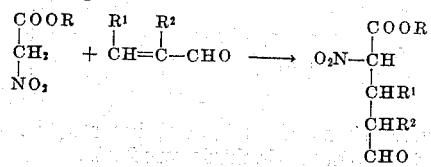

in which R, $R^1$ and $R^2$ are as above defined.

It has been found that the 1,4 addition of alkyl nitroacetates, such as ethyl nitroacetate, to acrolein, methacrolein and crotonaldehyde proceeds smoothly using a reaction diluent in the presence of catalytic quantities of a base. Suitable diluents include absolute ethanol, benzene, and the like. Suitable catalysts include alkali metal alkoxides such as sodium ethoxide, and tertiary low aliphatic amines such as tributylamine, triethylamine, tripropylamine, and the like.

Example 1

Ethyl nitroacetate (13.3 g.) was dissolved in absolute ethanol (100 cc.) containing sodium (0.03 g.). Acrolein (5.7 g.) was added dropwise and the reaction temperature increased from 25° C. to 33° C. The reaction mixture was cooled in a water bath in order to maintain the reaction temperatures at 30–33° C. After the addition of the alpha,beta-unsaturated aldehyde was completed, the reaction mixture was stirred at room temperature for three hours. Glacial acetic acid (0.3 cc.) was added. The absolute ethanol was removed in vacuo and the residual oil was dissolved in benzene. The benzene solution was washed with water and dried over anhydrous sodium sulfate. The benzene was removed by distillation in vacuo and the residual light brown oil was subjected to fractional distillation under reduced pressure. The aldehyde fraction was collected at 111–115° C. at 0.8 mm.

The aldehyde fraction was treated with 2,4-dinitrophenylhydrazine in a conventional manner. The corresponding hydrazone was obtained as a yellow-orange crystalline product melting at 105–108° C. Purification by crystillization from 95% ethanol increased the melting point to 110–111° C.

Analysis: Calcd. for $C_{13}H_{15}O_8N_5$: C, 42.27; H, 4.06; N, 18.96.

Found: C, 42.46; H, 4.23; N, 19.17.

Example 2

Ethyl nitroacetate (13.3 g.) was dissolved in 100 cc. of absolute ethanol containing 0.05 g. of sodium. Methacrolein (7.4 g.) was added dropwise to the above reaction mixture. After stirring at room temperature for four hours, the catalyst was neutralized with the requisite quantity of glacial acetic acid. The reaction product was isolated as described in Example 1. Distillation of the crude aldehydo compound yielded a main fraction which was collected at 89–90° C. at 0.3 mm.

The 2,4-dinitrophenylhydrazone was prepared in the usual manner and the crude product melted at 74–78° C. Repeated crystallizations from ethanol-ethyl acetate increased the melting point to 95–96° C.

Analysis: Calcd. for $C_{14}H_{17}O_8N_5$: C, 43.86; H, 4.43; N, 18.27.

Found: C, 43.99; H, 4.34; N, 18.43.

Example 3

The 1,4 addition of ethyl nitroacetate to crotonaldehyde was accomplished essentially as described in the previous examples. Distillation of the crude liquid aldehydo product yielded a main fraction collected at 90–96° C. at 0.4 mm. As the distillation continued very vigorous decomposition occurred. The 2,4-dinitrophenylhydrazone of gamma-carbethoxy-gamma-nitro-beta-methyl butyraldehyde melted at 88–90° C. after purification by crystallization from ethanol-ethyl acetate.

Analysis: Calcd. for $C_{14}H_{17}O_8N_5$: C, 43.86; H, 4.43; N, 18.27.
Found: C, 43.98; H, 4.47; N, 18.41.

As was indicated previously these aldehydes are useful in the snythesis of numerous amino acids. For example, gamma-carbethoxy-gamma-nitrobutyraldehyde is useful in the synthesis of DL-tryptophane, DL-ornithine, DL-glutamic acid, DL-lysine, and DL-proline. The general reactions involved in the synthesis of these amino acids are outlined as follows:

DL-tryptophane:

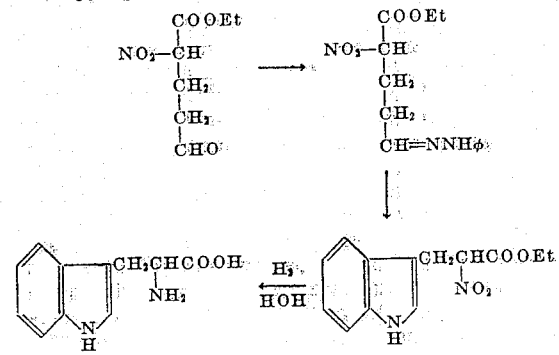

DL-lysine:

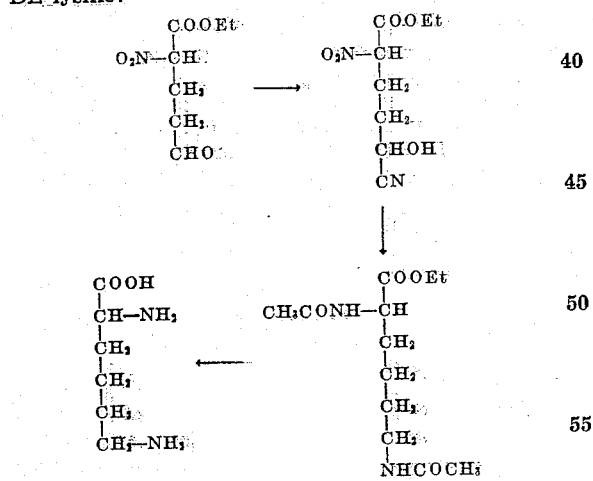

DL-glutamic acid:

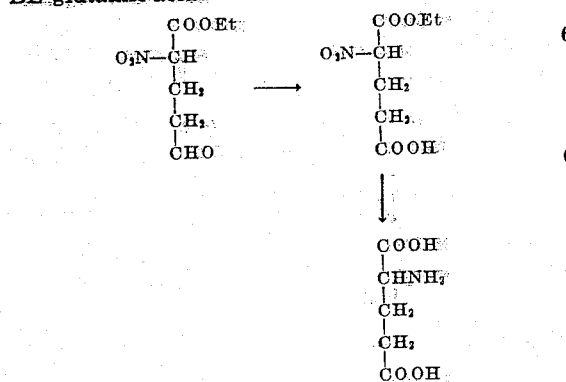

DL-ornithine:

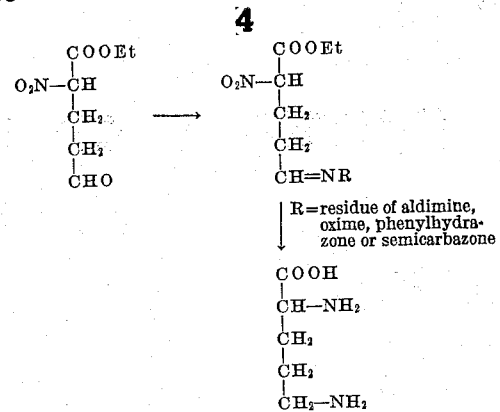

DL-proline:

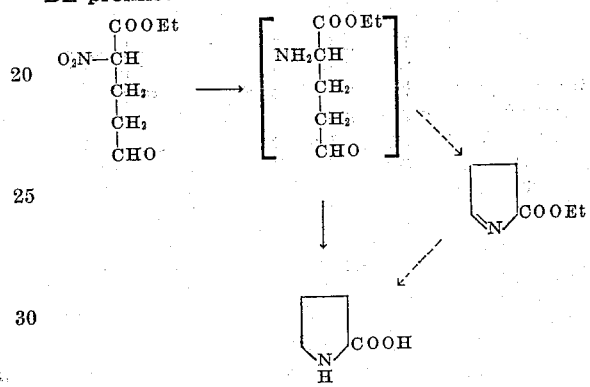

The aldehydo compounds are also of interest in the synthesis of alkyl substituted tryptophane in the same manner as that previously described. Furthermore, these aldehydes may be useful in the synthesis of numerous substituted adipic and pimelic acids in accordance with the following outline:

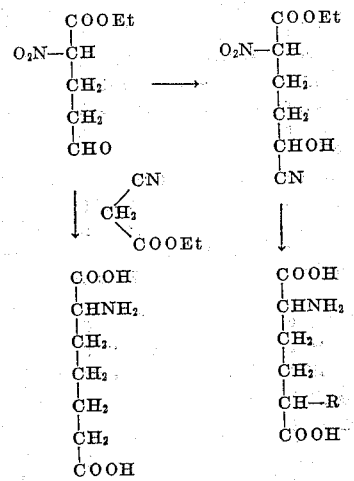

R = OH, NH₂, H

Moreover, numerous hydantoins may be prepared from these aldehyde products.

We claim as our invention:

1. Aldehydo compounds having the following formula

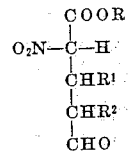

in which R is a lower alkyl group containing from 1 to 4 carbon atoms, and R¹ and R² are selected from the group consisting of hydrogen and methyl.

2. Gamma-nitro-gamma-carbethoxy butyraldehyde.

3. Alpha - methyl - gamma - nitro - gamma-carbethoxy butyraldehyde.

4. Beta - methyl - gamma - nitro - gamma-carbethoxy butyraldehyde.

5. Process of producing aldehydo compounds having the formula $$\begin{array}{c} COOR \\ | \\ O_2N-C-H \\ | \\ CHR^1 \\ | \\ CHR^2 \\ | \\ CHO \end{array}$$

in which R is an alkyl group containing from 1 to 4 carbon atoms, and $R^1$ and $R^2$ are selected from the group consisting of hydrogen and methyl, which comprises reacting the compound $$\begin{array}{c} COOR \\ | \\ CH_2 \\ | \\ NO_2 \end{array}$$

with an aldehyde having the formula $$\begin{array}{c} R^1 \quad R^2 \\ | \quad | \\ CH=C-CHO \end{array}$$

in the presence of an alkaline catalyst.

6. Process of producing alpha-methyl-gamma-nitro-gamma-carbethoxy butyraldehyde which comprises reacting ethyl nitroacetate with methacrolein in the presence of a small amount of an alkaline catalyst.

7. Process of producing beta-methyl-gamma-nitro-gamma-carbethoxy butyraldehyde which comprises reacting ethyl nitroacetate with crotonaldehyde in the presence of a small amount of alkaline catalyst.

8. Process of producing gamma-nitro-gamma-carbethoxy butyraldehyde which comprises reacting ethyl nitroacetate with acrolein in the presence of a small amount of alkaline catalyst.

OWEN A. MOE.
DONALD T. WARNER.

No references cited.